J. T. HONEN.
COUPLING.
APPLICATION FILED MAR. 20, 1919.

1,383,303.

Patented July 5, 1921.

Inventor
James T. Honen,
By Hull, Smith, Brock & West
Attys.

UNITED STATES PATENT OFFICE.

JAMES T. HONEN, OF CLEVELAND, OHIO, ASSIGNOR TO THE GRABLER MANUFACTURING COMPANY, OF CLEVELAND, OHIO, A CORPORATION OF OHIO.

COUPLING.

1,383,303.      Specification of Letters Patent.      Patented July 5, 1921.

Application filed March 20, 1919. Serial No. 283,839.

*To all whom it may concern:*

Be it known that I, JAMES T. HONEN, a citizen of the United States, residing at Cleveland, in the county of Cuyahoga and State of Ohio, have invented a certain new and useful Improvement in Couplings, of which the following is a full, clear, and exact description, reference being had to the accompanying drawings.
This invention relates to an improved coupler for use in electrical work for connecting conduits or armored cables to switch boxes, outlet boxes, or other receptacles.

The object of the invention is to provide a simply constructed and inexpensive device of the aforesaid character that possesses the maximum of holding efficiency and through which the work of attaching the conduit or cable to the receptacle is minimized.
To these ends I provide a bushing or sleeve designed at one end for connection to an outlet box or receptacle in register with a wire receiving aperture thereof and incorporating a clamping element preferably in the nature of a roller clutch, which will, when the conduit is projected into the sleeve or bushing, yield readily to admit the same but which will act to resist withdrawal of the conduit with accumulating force as the pull upon the conduit is increased; and preferably, the clamping element is arranged to enter a groove between adjoining convolutions of an armored cable so that upon a turning of the cable the same will be fed inward to engage its inner end snugly against the shoulder usual in couplers of this sort.

Figure 1:
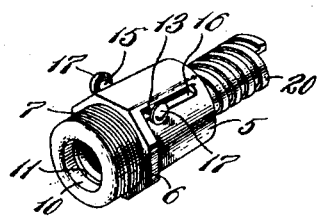
Figure 2:
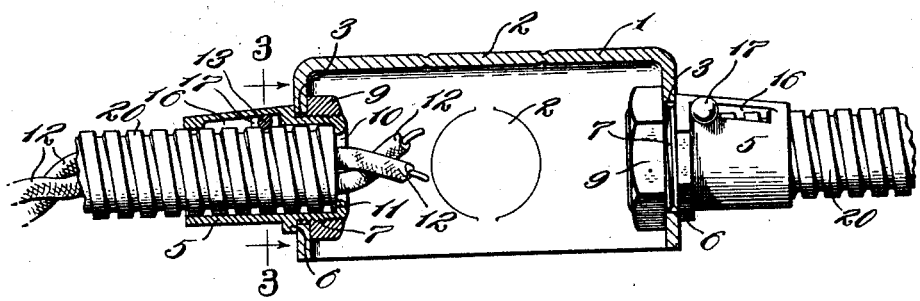

In the drawings accompanying and forming a part hereof, and wherein similar reference characters are used to designate corresponding parts, Figure 1 is a perspective view of the coupler with the end of an armored cable or conduit inserted therein; Fig. 2 is a sectional view through an outlet box or receptacle having cables or conduits attached thereto by means of my improved coupler; and Fig. 3 is a sectional detail on the line 3—3 of Fig. 2.

The receptacle 1 of the present illustration is an outlet box provided with the usual "knock out" slugs 2 which, until removed, close the wire admitting apertures 3.

My improved coupler consists of a sleeve or bushing 5 that is shown as having near one end a wrench receiving portion 6 beyond which the sleeve is threaded, as indicated at 7, and of a diameter to enter one of the wire receiving apertures 3 of the receptacle; and inside the receptacle the portion 7 has applied to it a clamping nut 9. The opening 10 at the inner end of the coupler is of less diameter than the interior of the sleeve so as to provide a shoulder 11; and it will be observed that the edge of the aperture 10 is rounded to prevent injury to the insulation of the wires or conductors 12.

Figure 3:
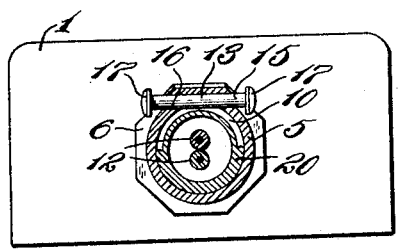

A clamping element 13, in the form of a cylindrical pin or roller, extends tangentially through one side of the sleeve and intersects the interior thereof slightly, as indicated in Fig. 3. The ends of the pin or roller are guided within slots 16 extending longitudinally of the sleeve but inclined toward the axis thereof from the inner toward the outer end (the end of the sleeve designed for attachment to the receptacle being regarded as the inner end). The essential point is that the wall or part of the device which resists outward movement of the clamping element in a direction radially of the sleeve be inclined inwardly from the inner toward the outer end of the sleeve. The construction shown is easy and economical of manufacture, and the ends of the pin or roller 15, where they project beyond the slots 16, are riveted over or upset as shown at 17, thus serving to hold the pin against displacement and providing a very convenient means for manipulating the clamping element when it is desired to release the conduit.

In connecting a conduit to a receptacle by means of my improved coupler, a slug 2 is knocked out of the receptacle to provide an aperture 3 through which the threaded end of the coupler is projected. A nut 9 is applied to the inner end of the sleeve to draw the shoulder, provided in the present instance by the wrench receiving portion 6, into firm contact with the outer wall of the receptacle. The end of the conduit 20 is then inserted into the sleeve of the coupler until its inner end abuts or is adjacent the shoulder 11. The clamping element 15 may now be wedged between the conduit and the opposed inclined wall of the coupler with sufficient tightness to resist withdrawal of the conduit, the element automatically assuming such condition if the coupler occupies a favorable position. Now, by turning the conduit, if it be of the armored variety, in the appropriate direction, its spiral groove coacting with the clamping element in the nature of a screw, will force the inner end of the conduit into firm contact with the shoulder 11. With the parts in such condition, the conduit is effectually held against withdrawal until the locking element is dislodged and moved toward the inner end of the sleeve.

Having thus described my invention, what I claim is:—

1. A device of the character set forth consisting of a sleeve designed for attachment to a receptacle in register with a wire admitting aperture thereof, and means carried by said sleeve permitting the easy introduction of the end of a conduit into the sleeve and acting automatically to lock the conduit against withdrawal therefrom.

2. A device of the character set forth consisting of a sleeve designed for attachment to a receptacle in register with a wire admitting aperture thereof, and a locking element disposed within the sleeve and having a part projecting without the same, said element permitting easy introduction of the end of a conduit into the sleeve while acting to resist withdrawal thereof, the locking element being adapted to be rendered ineffective by manipulation of its parts disposed exteriorly of the sleeve.

3. A device of the character set forth consisting of a sleeve designed for attachment to an outlet box in register with a wire admitting aperture thereof, said sleeve having a part inclined with respect to its longitudinal axis inwardly from the end designed for attachment to the outlet box toward its opposite end, and an element carried by the sleeve adjacent said part and adapted to be wedged between the same and an opposed part of a conduit inserted within said sleeve to withhold the conduit against withdrawal.

4. A device of the character set forth consisting of a sleeve designed at one end for attachment to a receptacle in register with a wire receiving aperture thereof and having a part inclined inwardly from said end toward the opposite end, and a roller arranged to operate between said part and an opposed part of a conduit when the latter is inserted within the sleeve thereby to hold the conduit against withdrawal.

5. A device of the character set forth consisting of a sleeve designed at one end for attachment to a receptacle in register with a wire receiving aperture thereof, said sleeve having opposed slots along one side that are inclined toward the axis of the sleeve from the aforesaid end toward the opposite end, and a roller having its ends confined within said slots.

6. A device of the character set forth consisting of a sleeve designed at one end for attachment to a receptacle and having a part inclined inwardly from said end toward its opposite end, a roller disposed for coöperation with said part and for engagement within a spiral groove and of an armored conduit adapted to be received by said sleeve, said roller being free to yield to the angular inclination of the groove.

7. A device of the character set forth consisting of a sleeve having attaching means at one end and provided with a wall that is inclined inwardly from said end toward its opposite end, the sleeve being provided with slots on opposite sides of the inclined wall, a cylindrical pin extending through said slots and arranged for engagement with the inclined wall, the ends of the pin being headed to prevent withdrawal from the slots.

8. A device of the character set forth consisting of a sleeve having an external shoulder spaced from one of its ends, the sleeve being threaded between said shoulder and said end and having an internal shoulder adjacent said end and a wall that is inclined inwardly from its external shoulder toward its opposite end, the sleeve being provided with slots on opposite sides of said inclined wall, and a pin extending through said slots and arranged to coöperate with said wall.

9. A device of the character set forth consisting of a sleeve having an external shoulder in the nature of a wrench receiving portion and threaded at one end beyond the same, one of the walls of the sleeve being inclined inwardly from said shoulder toward the other end of the sleeve, the sleeve having slots on opposite sides of its inclined wall, and a pin extending loosely through said slots and arranged for coöperation with the inclined wall, said pins being provided with heads beyond said slots.

In testimony whereof, I hereunto affix my signature.

JAMES T. HONEN.